(12) United States Patent
Brigham

(10) Patent No.: US 11,906,086 B2
(45) Date of Patent: Feb. 20, 2024

(54) FLANGE BELT

(71) Applicant: INTEGRITY PRODUCTS & SUPPLIES INC., Sherwood Park (CA)

(72) Inventor: Graham Brigham, Sherwood Park (CA)

(73) Assignee: INTEGRITY PRODUCTS & SUPPLIES INC., Sherwood Park (CA)

( * ) Notice: Subject to any disclaimer, the term of this patent is extended or adjusted under 35 U.S.C. 154(b) by 80 days.

(21) Appl. No.: 17/683,434

(22) Filed: Mar. 1, 2022

(65) Prior Publication Data

US 2022/0333722 A1 Oct. 20, 2022

(30) Foreign Application Priority Data

Apr. 15, 2021 (CA) .................................. CA 3115319

(51) Int. Cl.
*F16L 23/18* (2006.01)

(52) U.S. Cl.
CPC .................................... *F16L 23/18* (2013.01)

(58) Field of Classification Search
CPC .................................. F16L 23/16; F16L 23/18
See application file for complete search history.

(56) References Cited

U.S. PATENT DOCUMENTS

| | | | | |
|---|---|---|---|---|
| 3,439,945 A * | 4/1969 | Chambers | ............. | F16L 21/005 |
| | | | | 285/423 |
| 3,501,158 A * | 3/1970 | Tillman | ................. | F16J 15/062 |
| | | | | 285/334.4 |
| 4,470,609 A * | 9/1984 | Poe | ......................... | F16L 23/18 |
| | | | | 277/623 |
| 4,930,791 A * | 6/1990 | Ungchusri | ............. | F16L 17/06 |
| | | | | 285/354 |
| 5,174,615 A * | 12/1992 | Foster | ..................... | F16L 23/16 |
| | | | | 285/370 |
| 5,624,124 A * | 4/1997 | Ungchusri | ............. | F16J 15/121 |
| | | | | 277/625 |
| 5,944,319 A * | 8/1999 | Kohlman | ................ | F16L 23/18 |
| | | | | 277/626 |
| 7,467,799 B1 * | 12/2008 | Tarlton | ................. | F16J 15/0887 |
| | | | | 277/614 |
| 8,596,692 B1 * | 12/2013 | Gourlay | .................. | F16L 23/04 |
| | | | | 285/365 |
| 11,585,442 B2 * | 2/2023 | Byrne | ..................... | F16J 15/022 |
| 11,644,108 B2 * | 5/2023 | Meloy | ..................... | F16J 15/08 |
| | | | | 251/315.01 |
| 2009/0322078 A1 * | 12/2009 | Wern | ..................... | F16L 25/01 |
| | | | | 285/413 |

(Continued)

FOREIGN PATENT DOCUMENTS

JP 4291666 B2 * 7/2009
JP 2020106047 A * 7/2020

*Primary Examiner* — Eugene G Byrd
(74) *Attorney, Agent, or Firm* — Finch & Maloney PLLC

(57) ABSTRACT

A flange belt has a flexible belt with a flexible metal insert sheathed within it that allows the flange belt to conform to a flanged joint when the flange belt is wrapped around it. The flexible belt has a first longitudinal channel and a second longitudinal channel. A first band and a second band are sized to fit within the first longitudinal channel and the second longitudinal channel, respectively. The first band and the second band are used to hold the flexible belt on the flanged joint.

10 Claims, 5 Drawing Sheets

(56) References Cited

U.S. PATENT DOCUMENTS

| | | | |
|---|---|---|---|
| 2013/0181444 A1* | 7/2013 | Pires Cabado | F16L 21/06 |
| | | | 285/337 |
| 2013/0285369 A1* | 10/2013 | Gjerstad | F16L 23/167 |
| | | | 285/119 |
| 2017/0205003 A1* | 7/2017 | Crompton | F16L 37/091 |
| 2019/0170350 A1* | 6/2019 | Zogg | F23J 13/025 |
| 2020/0191305 A1* | 6/2020 | Rigollet | F16L 23/08 |

* cited by examiner

FLANGE BELT

FIELD OF THE DISCLOSURE

The present application relates generally to a flange belt that provides a seal over flanged joints on pipe systems.

BACKGROUND

This section provides background information to facilitate a better understanding of the various aspects of the invention. It should be understood that the statements in this section of this document are to be read in this light, and not as admissions of prior art.

It is common for pipe systems to be made up of multiple pipe segments. When flanged joints are used, it can be challenging to connect them in such a way that they are effectively sealed. This can lead to environmental contamination and loss of product due to leaks. When seals are used, it can be challenging to replace them when they fail. Further, small leakages may be easily missed and only become known when greater quantities of fluid leak from the flanged joints.

BRIEF SUMMARY

There is provided a flange belt. The flange belt has a flexible belt that has a first end, a second end, a first side, and a second side. A first longitudinal channel is positioned adjacent the first side of the flexible belt and extends from the first end of the flexible belt to the second end of the flexible belt. A second longitudinal channel is positioned adjacent the second side of the flexible belt and extends from the first end of the flexible belt to the second end of the flexible belt. The flexible belt may be wrapped around a flanged joint such that the first end of the flexible belt is positioned adjacent to the second end of the flexible belt. A flexible metal insert is sheathed within the flexible belt adjacent a bottom of the flexible belt. The flexible metal insert conforms to the flanged joint when the flexible belt is wrapped around the flanged joint. A first band is sized to fit within the first longitudinal channel. The first band has a first end and a second end. The first end of the first band and the second end of the first band are attachable to hold the first band in the first longitudinal channel when the flexible belt is wrapped around the flanged joint. A second band is sized to fit within the second longitudinal channel. The second band has a first end and a second end, the first end of the second band and the second end of the second band are attachable to hold the second band in the second longitudinal channel when the flexible belt is wrapped around the flanged joint.

In one embodiment, a joiner is provided. The joiner has a first attachment end and a second attachment end. The first attachment end contacts the first side of the flexible belt and the second attachment end contacts the second side of the flexible belt such that the joiner covers the first end of the flexible belt and the second end of the flexible belt when the flexible belt is wrapped around the flanged joint.

In one embodiment, the joiner is held on the flexible belt by friction.

In one embodiment, a drain tube is attachable to the joiner. The joiner will have an aperture such that the drain tube is in fluid communication with the aperture to allow for the collection of any fluids passing between the first end and the second end of the flexible belt.

In one embodiment, a collection bottle is attachable to the drain tube to collect fluid passing through the drain tube. A translucent or transparent collection bottle may be beneficial.

In one embodiment, the flexible belt is made of extruded rubber or silicon.

In one embodiment, the first longitudinal channel and the second longitudinal channel have the same width.

In one embodiment, the flexible metal insert is stainless steel.

In one embodiment, the first band and the second band are made of stainless steel.

In one embodiment, the joiner is made of stainless steel.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

DETAILED DESCRIPTION OF THE PREFERRED EMBODIMENTS

Figure 1:
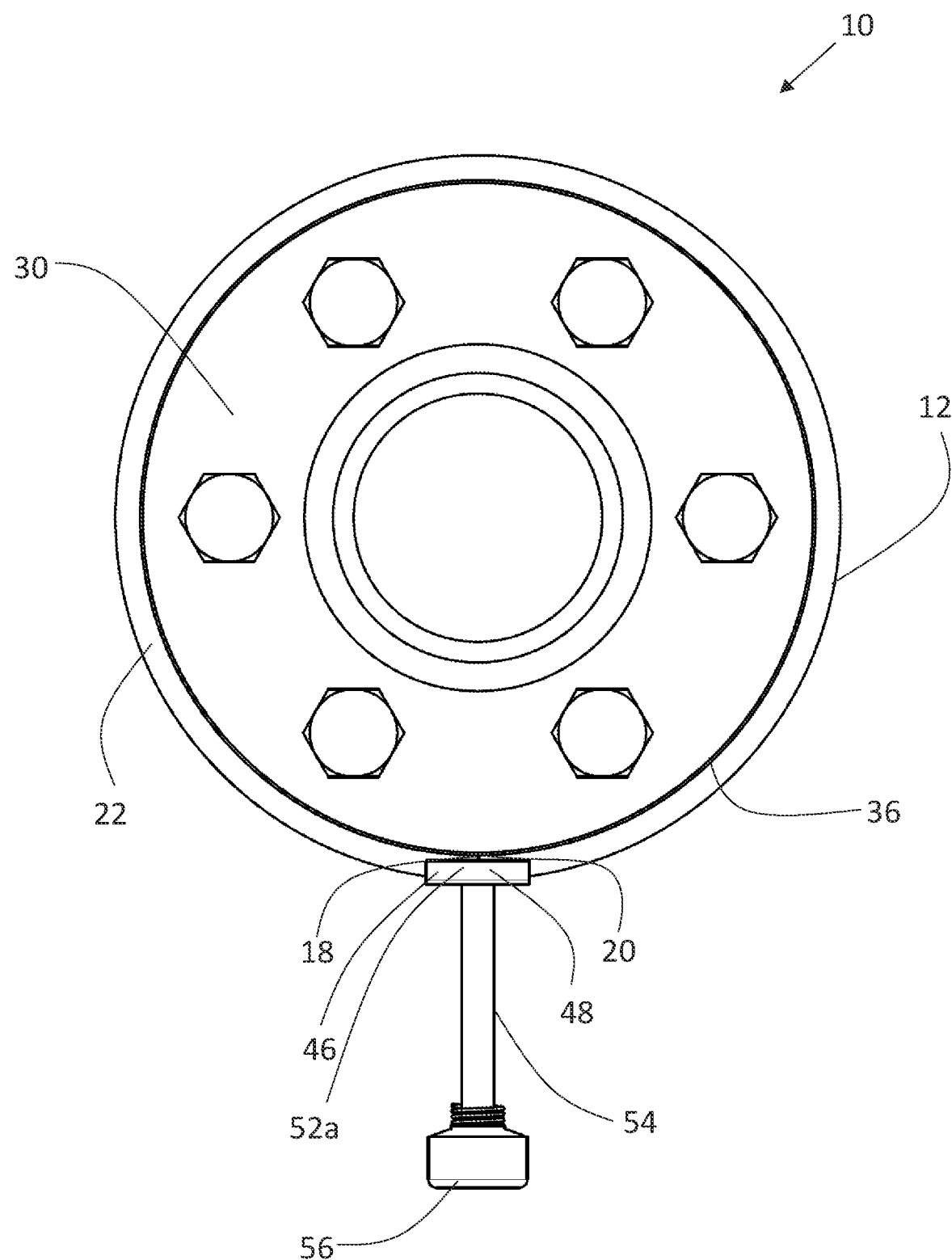
FIG. 1 is a side elevation view of a flange belt on a flange joint.

A flange belt, generally identified by reference numeral 10, will now be described with reference to FIG. 1 through FIG. 5.

Figure 2:
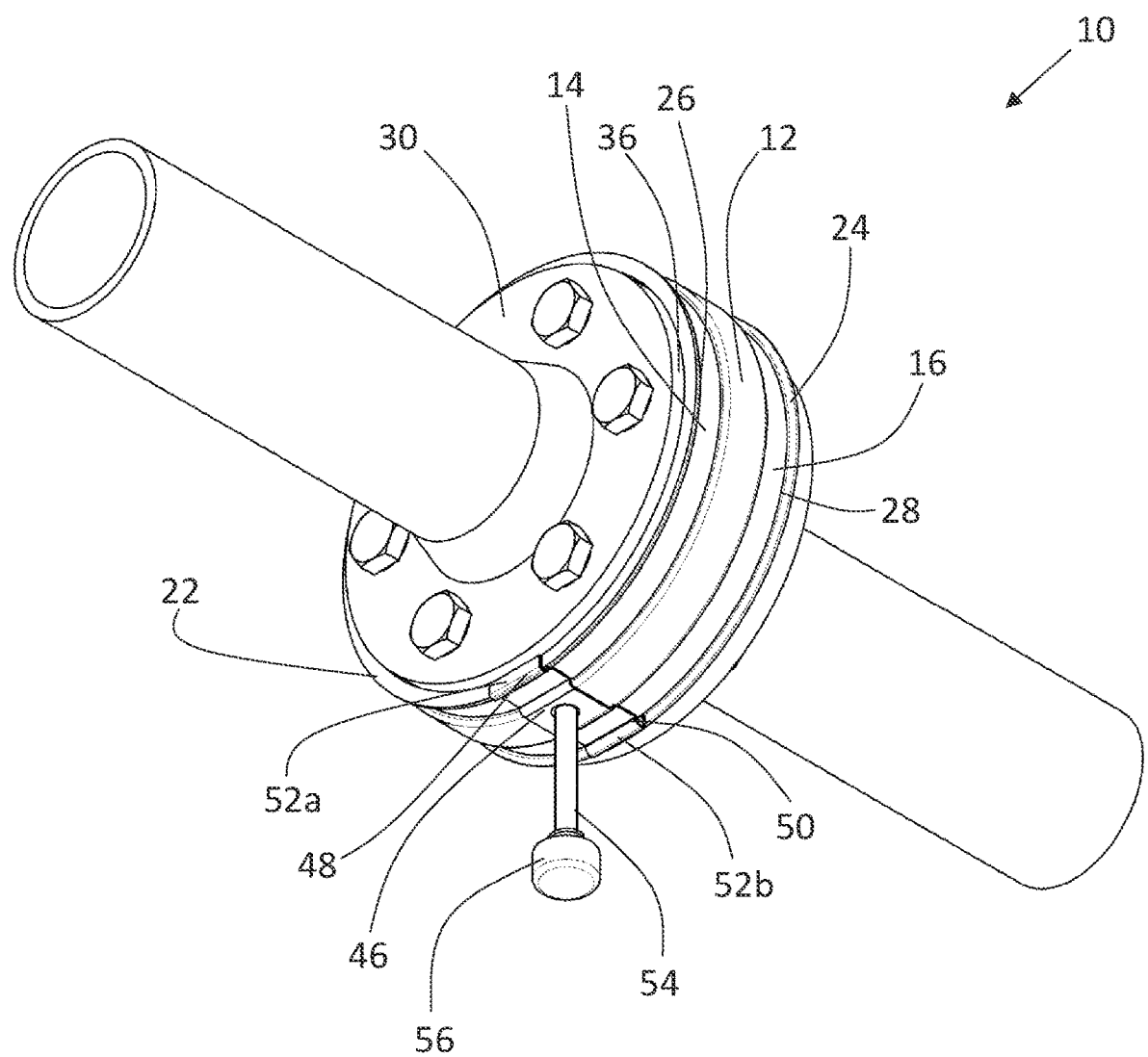
FIG. 2 is a perspective view of the flange belt on a flange joint.
Figure 5:
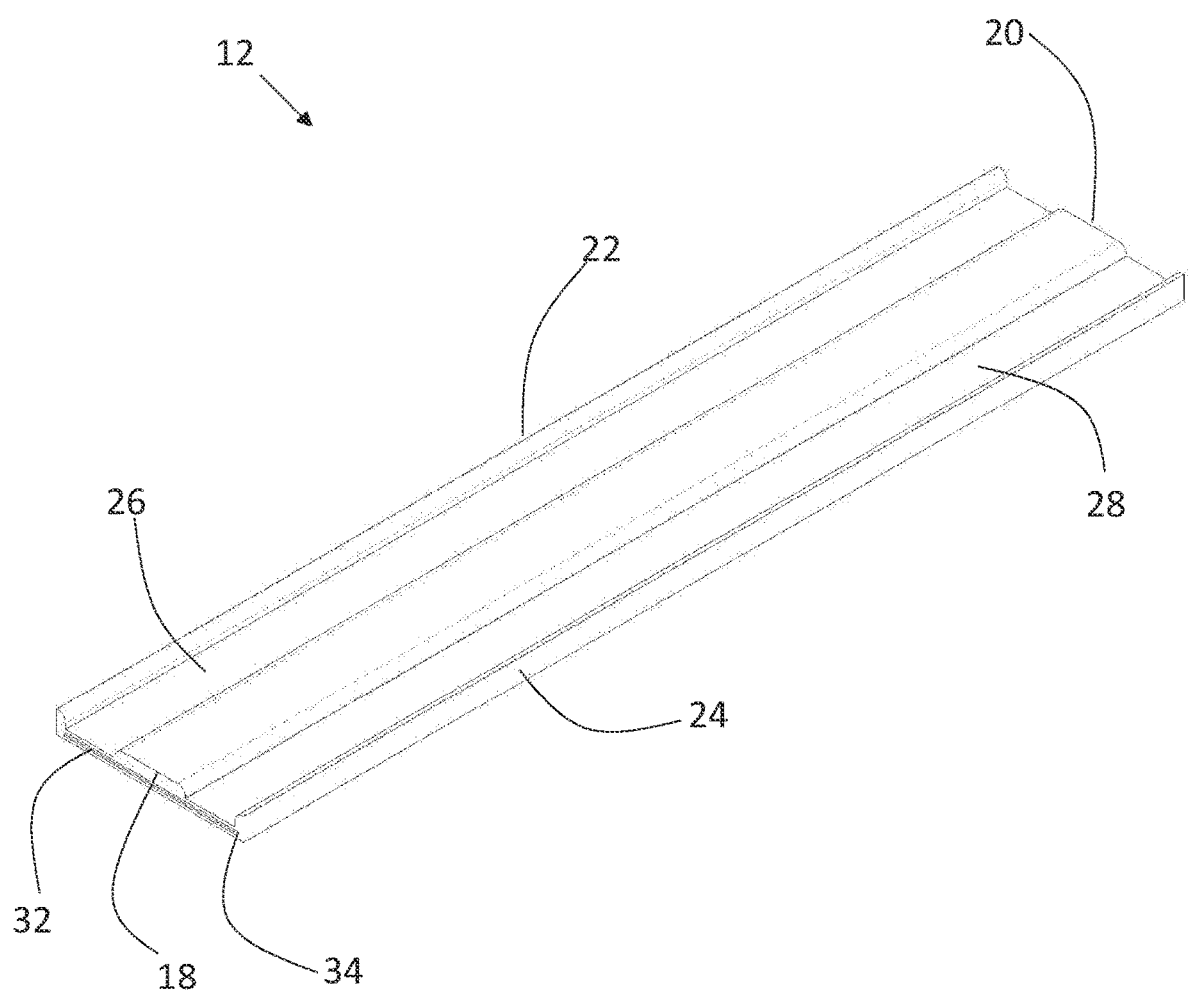
FIG. 5 is a perspective end view of the flexible belt of the flange belt.

Referring to FIG. 2, a flange belt 10 has a flexible belt 12, a first band 14 and a second band 16. Flexible belt 12 has a first side 22 and a second side 24. Referring to FIG. 5, flexible belt 12 has a first end 18 and a second end 20. A first longitudinal channel 26 is positioned adjacent first side 22 and extends from first end 18 to second end 20. A second longitudinal channel 28 is positioned adjacent second side 24 and extends from first end 18 to second end 20. First longitudinal channel 26 and second longitudinal channel 28 may have the same width or may have different widths. Flange belt 12 may be made of an extruded rubber, silicon, high heat silicon, plastic, or any other suitable material known to a person skilled in the art. Referring to FIG. 1, flexible belt 12 is wrappable around a flanged joint 30 such that first end 18 of flexible belt 12 is positioned adjacent to second end 20 of flexible belt 12. It will be understood by a person skilled in the art that first end 18 and second end 20 may be in direct contact with each other, overlap each other or have a small space between first end 18 and second end 20. When a space is present between first end 18 and second end 20, the sealing capabilities of flange belt 10 are reduced as the flanged joint 30 is not covered in its entirety. Flexible belt 12 may be cut to a predetermined size for use on specific flanged joint sizes or may be cut to custom lengths. First end 18 and second end 20 may also overlap such that a standard size flexible belt 12 may be used for any size flange joint without changes to length. It will be understood by a person skilled in the art that a large overlap may negatively impact the ability of flange belt 10 to seal effectively and protect against weathering and corrosion.

Figure 4:
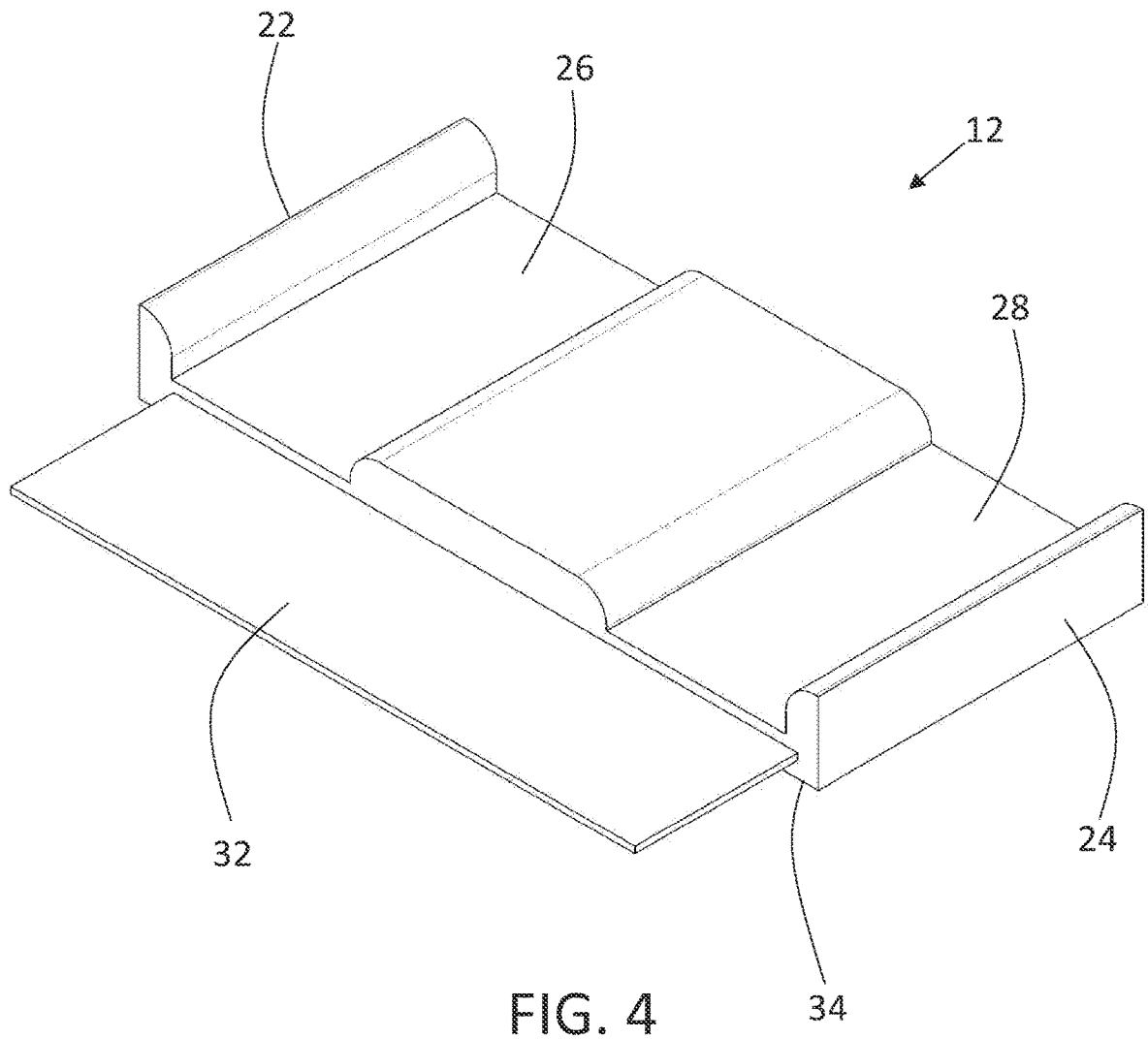
FIG. 4 is a perspective view, partially in section, of a portion of a flexible belt of the flange belt.

Referring to FIG. 4, to aid in conforming to the shape of flanged joint 30, a flexible metal insert 32 is sheathed within flexible belt 12 adjacent a bottom 34 of flexible belt 12. Referring to FIG. 1, this allows flexible belt 12 to conform to the irregularities on the outer circumference 36 of flange joint 30 where flexible belt 12 contacts flange joint 30. Referring to FIG. 4, flexible metal insert 32 may be stainless steel, flexible mild steel or any other suitable metal known to a person skilled in the art.

Figure 3:
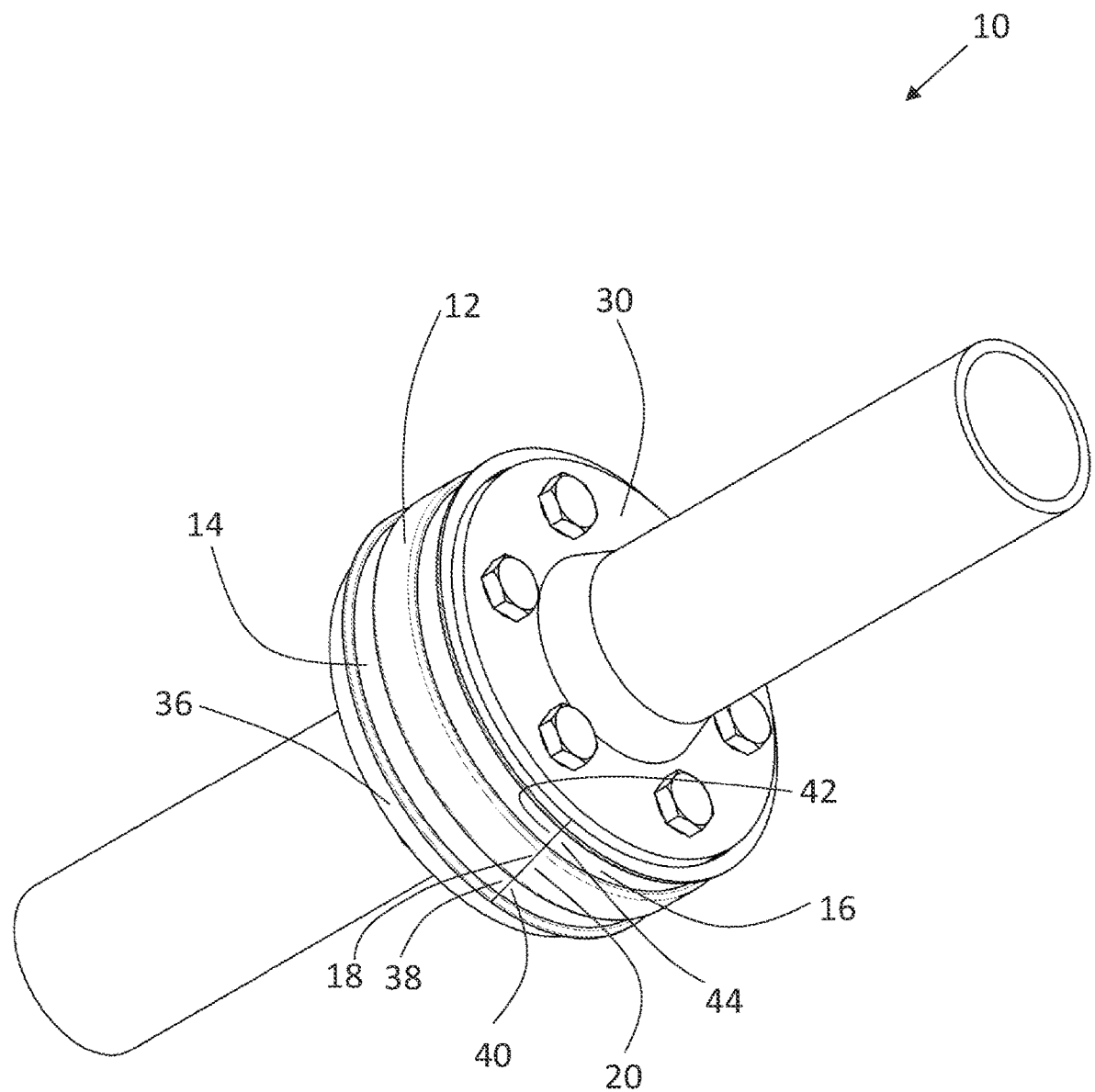
FIG. 3 is a perspective view of a flange belt on a flange joint.

Referring to FIG. 3, first band 14 is sized to fit within first longitudinal channel 26. First band 14 has a first end 38 and a second end 40. First band 14 may be made of stainless steel or any other suitable material known to a person skilled in the art. First end 38 and second end 40 of first band 14 are attachable such that they hold first band 14 in first longitudinal channel 26 and flexible belt 12 in position when wrapped around flanged joint 30. First end 38 and second end 40 may connect like a belt, with bands, through rivets, wire connections, sauntering, welding, brazing, soldering or any other suitable method known to a person skilled in the art.

Second band 16 is sized to fit within second longitudinal channel 28. Second band 16 may be made of stainless steel or any other suitable material known to a person skilled in the art. Second band 16 has a first end 42 and a second end 44. First end 42 and second end 44 of first band 16 are attachable such that they hold second band 16 in second longitudinal channel 28 and flexible belt 12 in position when wrapped around flanged joint 30. First end 42 and second end 44 may connect like a belt, with bands, through rivets, wire connections, sauntering, welding, brazing, soldering or any other suitable method known to a person skilled in the art.

In the embodiment shown in FIG. 2, a joiner 46 is provided. Joiner 36 has a first attachment end 48 and a second attachment end 50. Joiner 46 may be made of stainless steel or any other suitable material known to a person skilled in the art. First attachment end 48 contacts first side 22 of flexible belt 12. Second attachment end 50 contacts second side 24 of flexible belt. In the embodiment show, first attachment end 48 and second attachment end 50 have clips 52*a* and 52*b*, respectively, for holding joiner 46 on flexible belt 12. Joiner 46 may be held in position using friction, fasteners, or any other suitable method known to a person skilled in the art. Joiner 46 is positioned on flexible belt 12 such that it covers first end 18 and second end 20 when flexible belt 12 is wrapped around flanged joint 30.

A drain tube 54 may be attached to joiner 46 such that fluid leaking from flanged joint 30 and flange belt 10 may drain through drain tube 54. Drain tube 54 is provided in fluid communication with an aperture in joiner 46. Drain tube 54 may also be attached to a collection bottle 56 which allows for the collection of fluid passing through drain tube. A small amount of fluid in collection bottle 56 is an early indicator of leakage from flanged joint 30 and flange belt 12. This may provide an opportunity to take remedial steps to correct the leak before a catastrophic failure occurs. A catastrophic failure could result in loss of product or damage to the environment, personnel due to chemicals released from flanged joint 30. By making collection bottle 56 translucent or transparent, fluid in collection bottle 56 may be more easily noticed.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. A flange belt, comprising:
   a flexible belt having a first end, a second end, a first side, and a second side, a first longitudinal channel being positioned adjacent the first side of the flexible belt and extending from the first end of the flexible belt to the second end of the flexible belt, a second longitudinal channel being positioned adjacent the second side of the flexible belt and extending from the first end of the flexible belt to the second end of the flexible belt, the flexible belt being wrappable around a flanged joint such that the first end of the flexible belt is adjacent to the second end of the flexible belt;
   a flexible metal insert sheathed within the flexible belt adjacent to a bottom of the flexible belt, the flexible metal insert conforming to the flanged joint when the flexible belt is wrapped around the flanged joint;
   a first band being sized to fit within the first longitudinal channel, the first band having a first end and a second end, the first end of the first band and the second end of the first band being attachable to hold the first band in the first longitudinal channel when the flexible belt is wrapped around the flanged joint;
   a second band being sized to fit within the second longitudinal channel, the second band having a first end and a second end, the first end of the second band and the second end of the second band being attachable to hold the second band in the second longitudinal channel when the flexible belt is wrapped around the flanged joint;
   a joiner, the joiner having a first attachment end and a second attachment end, the first attachment end contacting the first side of the flexible belt and the second attachment end contacting the second side of the flexible belt such that the joiner covers the first end of the flexible belt and the second end of the flexible belt when the flexible belt is wrapped around the flanged joint;
   a drain tube attachable to the joiner; and
   a collection bottle attachable to the drain tube for collecting fluid that passes through the drain tube.

2. The flange belt of claim 1 wherein the joiner is held on the flexible belt by friction.

3. The flange belt of claim 1 wherein the flexible belt is made of extruded rubber.

4. The flange belt of claim 1 wherein the first longitudinal channel and the second longitudinal channel have the same width.

5. The flange belt of claim 1 wherein the flexible metal insert is stainless steel.

6. The flange belt of claim 1 wherein the first band and the second band are made of stainless steel.

7. The flange belt of claim 1 wherein the joiner is made of stainless steel.

8. The flange belt of claim 1 wherein the collection bottle is translucent.

9. The flange belt of claim 1 wherein the collection bottle is transparent.

10. The flange belt of claim 1 wherein the flexible belt is made of silicon.

* * * * *